June 29, 1948.    M. R. CROWE    2,444,130
COMBINED PRESSURE AND TEMPERATURE RELIEF VALVE
Filed June 17, 1944
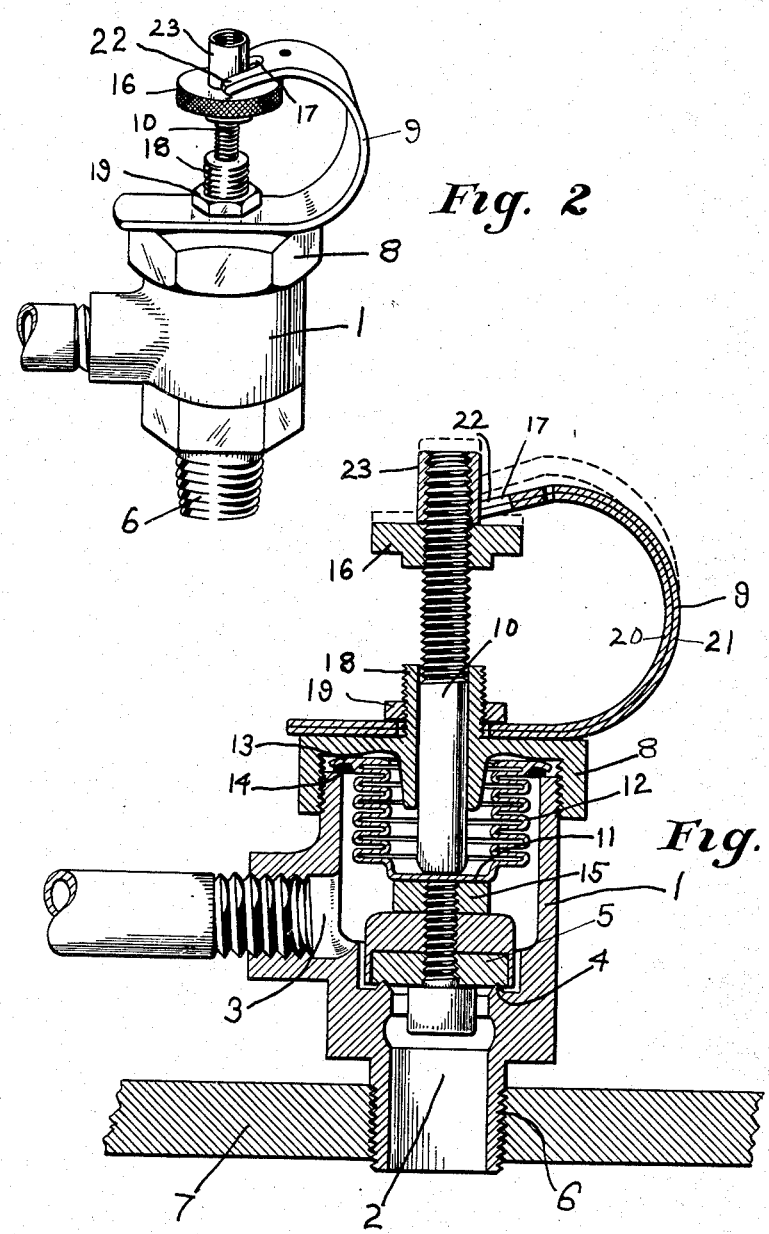
Matthew R. Crowe INVENTOR.
BY
Heard Smith Tennant
atty's Patented June 29, 1948

2,444,130

UNITED STATES PATENT OFFICE 2,444,130

COMBINED PRESSURE AND TEMPERATURE RELIEF VALVE

Matthew R. Crowe, Winthrop, Mass.

Application June 17, 1944, Serial No. 540,863

2 Claims. (Cl. 236—92)

This invention relates to a combined temperature and pressure relief valve which is adapted to be used in connection with kitchen boilers or in other locations where it is desirable that the valve should open in response to excessive pressure or excessive temperature for the purpose of venting the boiler or other container.

One of the objects of the invention is to provide a novel valve of this type in which the opening of the valve when either excessive pressure or excessive temperature develops is under the control of a single element which responds either to excessive pressure or to excessive temperature to permit the valve to open.

In order to give an understanding of the invention, I have illustrated a selected embodiment thereof which will now be described after which the novel features will be pointed out in the appended claims.

In the drawings:

Fig. 1 is a vertical sectional view through a valve embodying my invention.

Fig. 2 is a perspective view of said valve.

The improved valve herein shown comprises a valve body 1 having an inlet 2 and an outlet or discharge opening 3, said valve body being also provided with a valve seat 4 between the inlet and the outlet and with a valve 5 adapted to seat on said valve seat. In the form herein shown the valve body is provided with an exteriorly screw threaded nipple 6 adapted to screw into a kitchen boiler or other container 7 or into any piping system. The valve body is open at its upper end and is provided with the usual cap 8 which is screw threaded to the body.

In the present invention the valve 5 is normally held to its seat by a spring element which is also a thermostatic element, the resiliency of this element serving to hold the valve yieldingly against its seat but permitting the valve to open when excessive pressure develops in the boiler or container 7, and the thermostatic characteristics of said element functioning to allow the valve to open when the latter is subjected to excessive temperature without an accompanying excessive pressure.

This combined spring and thermostatic element may assume various forms without departing from the invention. It is located outside the valve body 1 and is so mounted thereon that it will respond to heat conducted thereto through the valve body from an excessively heated boiler. In the construction shown herein it is in the form of a C-shaped spring 9, one end of which is anchored to the cap 8 and the other end of which is free and is constructed to apply pressure to the valve 5 to hold it seated, said spring having a bimetallic construction so that it will change its shape as the temperature varies.

The spring pressure of the element 9 is applied to the valve 5 through a stem or rod 10 which is separate from the valve and which extends loosely through an opening in the cap 8 and projects some distance beyond the valve body. The lower end of the stem bears against the bottom 11 of a metallic bellows element 12, the upper end of which is provided with a flange 13 that is clamped between the upper edge of the valve body 1 and the cap 8. 14 indicates a packing ring which may be employed in connection with the flange to make a tight joint. The valve 5 is provided with an upstanding projection 15 which engages the bellows bottom 11.

The upper projecting end of the rod 10 is screw threaded and carries a nut 16 against the upper face of which the free end of the spring 9 rests, said free end of the spring being slotted as shown at 17 to receive the upper end of the stem 10.

Although the upstanding projection 15 and the rod or stem 10 are separate from each other, they constitute in effect a sectional or two-part valve stem by which the pressure of the spring element is transmitted to the valve.

This spring element 9 may be anchored to the cap 8 in various ways. As herein shown the cap is shown as having the exteriorly screw threaded boss 18 which extends through an opening in the lower end of the spring 9, said lower end of the spring being shaped to rest flatly against the cap 8. A clamping nut 19 serves to hold the spring 9 firmly clamped to the cap 8.

The amount of pressure which the spring 9 exerts on the valve 5 is determined by the adjustment of the nut 16. By screwing said nut upwardly on the stem, the spring 9 will be placed under tension and will, therefore, exert an increased pressure against the valve.

In installing the valve, the nut 16 will be adjusted to provide the proper pressure against the valve to hold it to its seat against any normal pressure at normal temperature within the container 7. If, however, an excessive pressure develops within the container, the spring 9 will yield to allow the valve to lift from its seat, thus relieving the pressure.

As stated above, the spring element 9 is also a thermostatic element by reason of its being made as a bimetallic element comprising the two metal strips 20, 21 which have different coefficients of expansion and which are welded together as usual in bimetallic thermostatic elements.

This bimetallic element 9 may be made so that it will function when submitted to excessive temperature which is either excessively high or excessively low. If the valve is designed to relieve pressure in the boiler when the temperature within the boiler rises above a predetermined critical point, then the bimetallic element 9 will be so constructed that when it is heated it tends to open up, that is, the upper free slotted end 22 tends to move upwardly. Such upward movement of the end 22 will obviously reduce or relieve the pressure which said element 9 applies to the valve 5 and the valve will thus be permitted to open at lower than normal pressure, thereby venting the container 3. It will be noted that the valve body 1 is attached directly to the boiler 7 and hence whenever excessive temperature develops within the boiler, whether or not such excessive temperature is accompanied by excessive pressure, an increased amount of heat will be conducted from the boiler to the spring element 8 through the valve body. Such increased amount of heat will raise the temperature of the spring element and as its temperature rises, the upper end of the spring will tend to move upwardly thereby reducing the downward pressure of the spring on the valve and allowing the valve to be opened by a boiler pressure below normal. A practical application of the valve herein shown is its use in connection with a domestic hot water boiler such as is used for heating water for household purposes. Such boilers are commonly provided with a discharge pipe through which the hot water is delivered from the boiler and with a supply pipe through which cold water is delivered to the boiler. When the valve herein shown is installed on a hot water heater for domestic use, it is independent from either the hot water discharge pipe or the cold water supply pipe. If, therefore, excessive temperature develops within the boiler, the valve 5 will open as above described, thus allowing a discharge from the boiler through the discharge port 3, and this will result in fresh unheated water being delivered to the boiler through its supply pipe. The delivery of such cold water to the boiler will operate to reduce the excessive temperature therein and when the temperature in the boiler has been reduced to normal, the valve 5 will be automatically closed by the spring 9.

If it is desired that the thermostatic element should operate to open the valve when the temperature drops below a certain predetermined point, then the bimetallic element 9 will be so constructed that as it cools it will tend to open, while when it is subjected to heat, it will tend to close. If this thermostatic element is constructed in this way, then the nut 16 may be adjusted on the stem so that when the element 5 is cooled to a predetermined temperature it will relieve the pressure on the valve and thus allow the valve to open. A valve having this construction would be useful in an installation where it is desirable to drain a pipe or container if the temperature fell to or below freezing so as to prevent any damage due to freezing of water in the container or pipe.

23 indicates a set nut screw threaded to the upper end of the stem 10 and by which the adjusting nut 16 may be locked in its adjusted position.

An advantage resulting from using the two-part valve stem comprising the upper portion 10 and the extension 15 which are separate from each other is that the valve itself is free to seat itself on the valve seat 4 and the stem 10 is free to move through the opening of the cap even though the valve and the stem 10 should not be in exact axial alinement.

An advantage resulting from using the metallic bellows 12 as a packing element to provide a tight joint between the cap 8 and the valve casing 1 is that it eliminates the necessity of packing the stem 10 in order to prevent leakage around the stem. With this construction, the stem element 10 may be made to slide freely through the opening in the cap to make the valve more sensitive in its operation.

From the above, it will be seen that my invention provides a single element, the bimetallic spring element 9, which has resilient characteristics that enable it to function as a spring to hold the valve yieldingly against its seat and to permit the valve to open when excessive pressure develops within the container, and which also has thermostatic characteristics which respond to excessive temperature (either high temperature or low temperature) to permit the valve to open whenever such excessive temperature arises.

While I have illustrated this combined spring and thermostatic element as having a C shape, yet the invention is not limited to this particular construction, as it may be embodied in combined spring and thermostatic elements of other shapes.

I claim:

1. A combined pressure and temperature relief valve for hot water boilers and the like, comprising a valve body having provision for securing it directly to a hot water boiler independently of any other connection leading to or from said boiler, said valve body having an inlet which opens directly into the boiler and an outlet leading to a point outside the boiler, an outwardly opening valve for closing the connection between the inlet and outlet, said valve having a valve stem which extends through the valve body and projects therefrom, a thermostatic spring element located entirely exterior to the valve body, means for securing said spring element rigidly to the valve body, said spring element acting against the projecting portion of the valve stem to hold the valve yieldingly in closed position against internal pressure within the boiler, the resiliency of the spring element permitting the valve to open to relieve excessive pressure within the boiler, said spring element, by reason of its thermostatic characteristics, being responsive to heat conducted thereto through the valve body from an excessively heated boiler to reduce its valve seating pressure against said valve stem, whereby under normal temperature conditions in the boiler the valve will be opened only by excessive pressure within the boiler, but when excessive temperature conditions arise within the boiler the valve will be opened by a reduced pressure.

2. A combined pressure and relief valve for hot water boilers, said valve comprising a valve body having a nipple screw threaded directly to the boiler and providing an inlet opening directly into the interior of the boiler, said valve body also having an outlet leading to a point outside of the boiler and further having a valve seat within the body between the inlet and the outlet, an outwardly opening valve seating against said valve seat and subjected to the pressure within the boiler, a valve stem for the valve extending through and beyond the valve casing and having its outer projecting end screw threaded, a C-shaped bimetallic spring element having both resilient and thermostatic characteristics situated entirely outside of the valve body, means clamping one arm of said spring element to the valve body on the exterior thereof, a collar screw threaded to the projecting end of the valve stem and against the outer face of which the other arm of said spring has engagement, whereby the resiliency of the spring applies a downward pressure on the valve stem to hold the valve yieldingly seated against normal pressure within the boiler, said bimetallic spring element being responsive to heat conducted thereto from an excessively heated boiler to reduce the downward spring pressure of said spring against the valve stem, whereby when excessive pressure is developed within the boiler at normal temperature, the spring yields to allow the valve to open and relieve such pressure, while when the spring becomes abnormally heated by heat conducted thereto from an excessively heated boiler, the valve-seating force of the spring is reduced thereby allowing the valve to open at a reduced pressure.

MATTHEW R. CROWE.

REFERENCES CITED

The following references are of record in the file of this patent:

UNITED STATES PATENTS

| Number | Name | Date |
|---|---|---|
| 1,206,625 | Vetter | Nov. 28, 1916 |
| 1,514,816 | Anderson | Nov. 11, 1924 |
| 1,927,036 | Johnson | Sept. 19, 1933 |
| 1,968,553 | Heitger | July 31, 1934 |
| 1,994,698 | Evers | Mar. 19, 1935 |
| 2,008,835 | Rawcliffe | July 23, 1935 |
| 2,116,802 | Shivers | May 10, 1938 |
| 2,145,925 | Geisel | Feb. 7, 1939 |
| 2,257,972 | McCollum | Oct. 7, 1941 |